US009817689B2

(12) United States Patent
Bonzini et al.

(10) Patent No.: US 9,817,689 B2
(45) Date of Patent: Nov. 14, 2017

(54) DIRTY PAGE TRACKING OF GUEST-UNCACHED MEMORY

(71) Applicant: Red Hat, Inc., Raleigh, NC (US)

(72) Inventors: Paolo Bonzini, Turate (IT); Laszlo Ersek, Budapest (HU); Jonathan Masters, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 245 days.

(21) Appl. No.: 14/634,204

(22) Filed: Feb. 27, 2015

(65) Prior Publication Data

US 2016/0253197 A1 Sep. 1, 2016

(51) Int. Cl.
*G06F 9/46* (2006.01)
*G06F 9/455* (2006.01)
*G06F 12/0893* (2016.01)
*G06F 12/0808* (2016.01)

(52) U.S. Cl.
CPC ...... *G06F 9/45558* (2013.01); *G06F 12/0808* (2013.01); *G06F 12/0893* (2013.01); *G06F 2009/45583* (2013.01); *G06F 2212/1041* (2013.01); *G06F 2212/601* (2013.01)

(58) Field of Classification Search
None
See application file for complete search history.

(56) References Cited

U.S. PATENT DOCUMENTS

| | | | |
|---|---|---|---|
| 6,895,491 B2 | 5/2005 | Kjos et al. | |
| 7,370,160 B2 | 5/2008 | Neiger et al. | |
| 7,406,476 B1 * | 7/2008 | Galloway | G06F 9/52 |
| 7,823,151 B2 | 10/2010 | Seth et al. | |
| 8,230,155 B2 | 7/2012 | Oshins | |
| 8,438,363 B1 * | 5/2013 | Koryakin | G06F 12/1036 711/207 |
| 8,549,230 B1 * | 10/2013 | Chatterjee | G06F 3/0608 711/113 |
| 9,201,612 B1 * | 12/2015 | Vincent | G06F 3/0662 |
| 2008/0059726 A1 * | 3/2008 | Rozas | G06F 21/53 711/156 |
| 2012/0144128 A1 * | 6/2012 | Serebrin | G06F 9/467 711/149 |

(Continued)

OTHER PUBLICATIONS

"x86 Instruction Set Architecture", Jul. 27, 2014.*

(Continued)

*Primary Examiner* — Bradley Teets
(74) *Attorney, Agent, or Firm* — Haynes and Boone, LLP

(57) ABSTRACT

An example method of providing a dirty bitmap to an application includes receiving a request for a snapshot of an internal dirty bitmap. The internal dirty bitmap indicates whether a guest has updated one or more pages in guest memory since a previously received request for a snapshot of the internal dirty bitmap. The method also includes copying a set of bits of the internal dirty bitmap into a shared dirty bitmap, which is accessible by the hypervisor and application. The method further includes for each bit of the set of bits having a first value, setting the respective bit to a second value. The method also includes invalidating all cache lines in a set of pages corresponding to one or more bits having the first value in the shared dirty bitmap. The method further includes after invalidating the cache lines, providing the shared dirty bitmap to the application.

20 Claims, 5 Drawing Sheets

(56) References Cited

U.S. PATENT DOCUMENTS

| | | | |
|---|---|---|---|
| 2012/0233411 A1* | 9/2012 | Pohlack | G06F 12/0815 |
| | | | 711/147 |
| 2013/0262736 A1 | 10/2013 | Kegel et al. | |
| 2014/0189195 A1* | 7/2014 | Chen | G06F 9/5016 |
| | | | 711/6 |
| 2014/0331023 A1 | 11/2014 | Sharp et al. | |
| 2016/0004644 A1* | 1/2016 | Samanta | G06F 12/0891 |
| | | | 711/3 |

OTHER PUBLICATIONS

[PATCH] Xen: Arm: Force Guest Memory Accessesto Cacheable When MMU is Disabled, Jan. 2014, 37 pages, retrieved from http://www.gossamer-threads.com/lists/xen/devel/313074 on Feb. 27, 2015.

Changyeon Jo, Erik Gustafsson, Jeongseok Son, Bernhard Egger, Efficient Live Migration of Virtual Machines Using Shared Storage; Mar. 16-17, 2013, 10 pages, School of Computer Science and Engineering, Seoul National University, retrieved from https://labs.vmware.com/vee2013/docs/p41.pdf on Feb. 27, 2015.

Stephen Duverger; Ramooflax, 30 pages; EADS Innovation Works, Suresnes, France, retrieved from https://github.com/sduverger/ramooflax/wiki/ramooflax_en.pdf on Feb. 27, 2015.

Mathias Gottschlag; Virtualization and Migration with GPGPUs, Feb. 15, 2013-Jun. 14, 2013, 54 pages; Karlsruher Institute for Technologie; retrieved from http://os.itec.kit.edu/downloads/ba_2013_gottschlag-mathias_GPGPU.pdf on Feb. 27, 2015.

* cited by examiner

DIRTY PAGE TRACKING OF GUEST-UNCACHED MEMORY

FIELD OF DISCLOSURE

The present disclosure generally relates to a virtualization system, and more particularly to tracking pages accessed by a guest.

BACKGROUND

A virtual machine is a portion of software that, when executed on appropriate hardware, creates an environment allowing the virtualization of an actual physical computer system. Each virtual machine may function as a self-contained platform, running its own operating system (OS) and software applications (processes).

A host machine (e.g., computer or server) is typically enabled to simultaneously run one or more virtual machines, where each virtual machine may be used by a local or remote client. The host machine allocates a certain amount of the host's resources to each of the virtual machines. Each virtual machine may use the allocated resources to execute applications, including OSs known as guest OSs. The hypervisor virtualizes the underlying hardware of the host machine or emulates hardware devices, making the use of the virtual machine transparent to the guest operating system or the remote client that uses the virtual machine. Typically, a hypervisor manages allocation and virtualization of computer resources and performs context switching, as may be necessary, to cycle between various virtual machines.

BRIEF SUMMARY

This disclosure relates to tracking pages accessed by a guest relative to snapshots of an internal dirty bitmap. Methods, systems, and techniques for providing a dirty bitmap to an application executable in a host machine are provided.

According to an embodiment, a method of providing a dirty bitmap to an application executable in a host machine includes receiving, by a hypervisor executable in a host machine, a request for a snapshot of an internal dirty bitmap stored at a first region of memory. The request is from an application that communicates with the hypervisor. The internal dirty bitmap indicates whether a guest executable in the host machine has updated one or more pages in guest memory of the guest since a previously received request for a snapshot of the internal dirty bitmap. The method also includes copying a set of bits of the internal dirty bitmap into a shared dirty bitmap. The shared dirty bitmap is stored at a second region of memory and is accessible by the hypervisor and application. The method further includes for each bit of the set of bits having a first value, setting the respective bit to a second value. The method also includes invalidating all cache lines in a set of pages corresponding to one or more bits having the first value in the shared dirty bitmap. The method further includes after invalidating the cache lines, providing the shared dirty bitmap to the application.

According to another embodiment, a system for providing a dirty bitmap to an application executable in a host machine includes a first region of memory that stores an internal dirty bitmap indicating whether a guest executable in a host machine has updated one or more pages in guest memory of the guest since a previously received request for a snapshot of the internal dirty bitmap. The system also includes a hypervisor that receives a request for a snapshot of the internal dirty bitmap. The request is from an application that communicates with the hypervisor. The system further includes a dirty memory manager that copies a set of bits of the internal dirty bitmap into a shared dirty bitmap stored at a second region of memory, sets each bit in the internal dirty bitmap having a first value to a second value, invalidates all cache lines in a set of pages corresponding to one or more bits having the first value in the shared dirty bitmap, and provides the shared dirty bitmap to the application after the cache lines in the set of pages have been invalidated. The second region of memory is accessible by the hypervisor and application.

According to another embodiment, a non-transitory machine-readable medium includes a plurality of machine-readable instructions that when executed by one or more processors are adapted to cause the one or more processors to perform a method including: receiving, by a hypervisor executable in a host machine, a request for a snapshot of an internal dirty bitmap stored at a first region of memory, the request being from an application that communicates with the hypervisor, and the internal dirty bitmap indicating whether a guest executable in the host machine has updated one or more pages in guest memory of the guest since a previously received request for a snapshot of the internal dirty bitmap; copying a set of bits of the internal dirty bitmap into a shared dirty bitmap, the shared dirty bitmap being stored at a second region of memory and accessible by the hypervisor and application; for each bit of the set of bits having a first value, setting the respective bit to a second value; invalidating all cache lines in a set of pages corresponding to one or more bits having the first value in the shared dirty bitmap; and after the invalidating, providing the shared dirty bitmap to the application.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
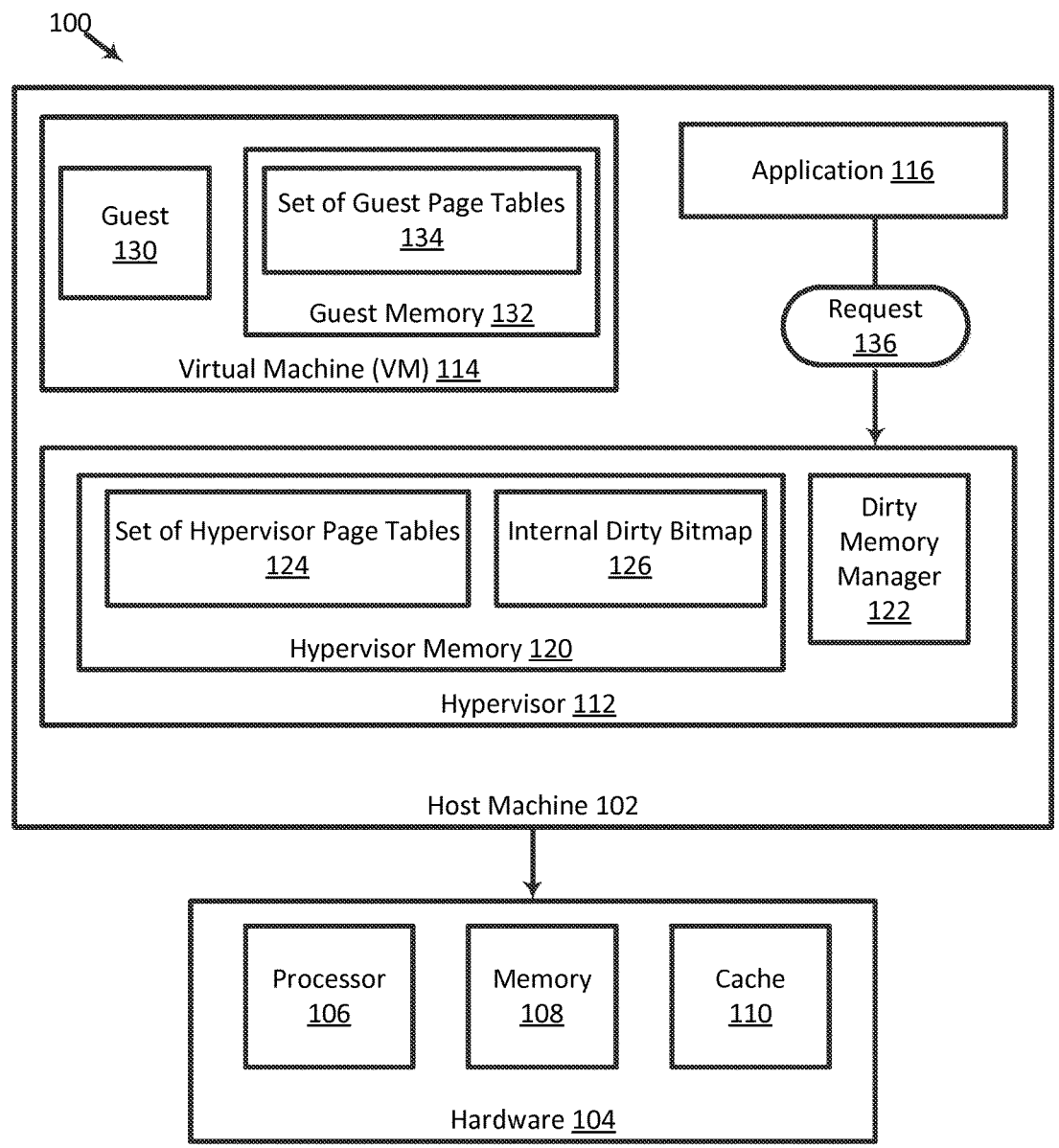
FIG. 1 is a simplified block diagram illustrating a system for providing a dirty bitmap to an application executable in a host machine, according to some embodiments.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture

III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

According to an embodiment, a method of providing a dirty bitmap to an application executable in a host machine includes receiving, by a hypervisor executable in a host machine, a request for a snapshot of an internal dirty bitmap stored at a first region of memory. The request is from an application that communicates with the hypervisor. The internal dirty bitmap indicates whether a guest executable in the host machine has updated one or more pages in guest memory of the guest since a previously received request for a snapshot of the internal dirty bitmap. The method also includes copying a set of bits of the internal dirty bitmap into a shared dirty bitmap. The shared dirty bitmap is stored at a second region of memory and is accessible by the hypervisor and application. The method further includes for each bit of the set of bits having a first value, setting the respective bit to a second value. The method also includes invalidating all cache lines in a set of pages corresponding to one or more bits having the first value in the shared dirty bitmap. The method further includes after invalidating the cache lines, providing the shared dirty bitmap to the application.

II. Example System Architecture

FIG. 1 is a simplified block diagram illustrating a system 100 for providing a dirty bitmap to an application executable in a host machine, according to some embodiments. System 100 includes a host machine 102 coupled to hardware 104. Hardware 104 includes a processor 106, memory 108, and a cache 110, and may include other I/O devices. A host machine may run one or more VMs that run applications and services. Host machine 102 includes a hypervisor 112, virtual machine (VM) 114, and application 116. Although one VM is illustrated as running on host machine 102, other embodiments including more than one VM are within the scope of the present disclosure. The hypervisor may allow multiple operating systems (OSs), called guests, to run on the same physical system by offering virtualized hardware to the guests. The host machine may run multiple OSs, concurrently and in isolation from other programs on a single system. A VM may include a guest that executes a device driver (not shown) that communicates with the hardware devices.

In a virtualization environment, the hypervisor and each guest running in host machine 102 has its own set of page tables. Hypervisor 112 includes hypervisor memory 120 and a dirty memory manager 122. Hypervisor 112 maintains a set of hypervisor page tables 124 in hypervisor memory 120. Set of hypervisor page tables 124 includes one or more mappings from guest-physical memory addresses to host-physical memory addresses, which correspond to physical memory on a native platform. Host-physical memory is hardware memory.

Additionally, each guest maintains its own set of page tables. A guest 130 running on VM 114 may be provided with a guest memory 132. Guest 130 maintains a set of guest page tables 134 in guest memory 132. Set of guest page tables 134 includes one or more mappings from guest-virtual memory addresses to guest-physical memory addresses, which are guest 130's illusion of physical memory. This illusion is supported by hypervisor 112, which maps guest 130's guest-physical memory addresses to host-physical memory addresses. The translation from guest-physical memory addresses to host-physical memory address is a real-to-physical mapping that implements the virtualization of memory in a VM system. The combined total size of the guest-physical memory space of all the guests running on host machine 102 may be bigger than the actual physical memory on the system. Accordingly, hypervisor 112 may maintain a swap space, distinct from the swap spaces of each of the guests, and may manage host-physical memory by swapping guest real pages into and out of its own swap space.

Each entry in a guest page table maps a location in guest 130's virtual memory space to a location in guest 130's physical memory space. Address translation in guest 130 transforms addresses in its guest-virtual address space to locations in guest-physical memory using set of guest page tables 134. To convert a guest-physical memory address to a host-physical memory address, hypervisor 112 maintains a real map table mapping guest-physical memory pages to host-physical memory pages, and in particular uses set of hypervisor page tables 124 to translate guest-physical memory addresses to host-physical memory addresses.

Each entry in set of guest page tables 134 may have an access attribute indicating whether the page corresponding to the entry is cacheable or uncacheable. Guest 130 may force memory to be treated as uncacheable even if hypervisor 112 thinks the memory is cacheable. In an example, guest 130 may mark a page in memory as uncachable if, for example, guest 130 has not yet enabled set of guest page tables 134. In such an example, all the pages in guest memory 132 may be uncacheable by default. In another example, a memory device (e.g., media memory) may be cached on hypervisor 112 and guest 130 may be unaware of this. In such an example, set of guest page tables 134 may be marked as uncacheable.

Two mappings are used to determine guest 130's guest-virtual memory addresses in physical memory of the host hardware. In contrast, one mapping is used to map hypervisor 112's virtual memory addresses to physical memory of the host hardware. This type of mapping ignores guest 130's set of guest page tables 134. Accordingly, it may be possible for guest 130 and hypervisor 112 to have different notions of memory coherency. For example, guest 130 may access memory that is marked as uncacheable by guest 130, and later the same memory may be accessed by hypervisor 112 or host machine 102 without reading set of guest page tables 134. In such an example, guest 130 accesses the memory directly because in its view the memory is uncacheable. In contrast, hypervisor 112 or host machine 102 may access cache 110 because hypervisor 112 or host machine 102 thinks that the memory is cacheable. This may cause problems because cache 110 may include stale data. It may be desirable for hypervisor 112 to ensure that guest 130 and host machine 102 do not have different versions of the same page content. This may be advantageous, for example, for live migrations of VMs.

Application 116 is in communication with hypervisor 112 and may desire to perform some work in memory 108. To perform some work in memory 108, application 116 may desire to know which pages have been accessed by guest 130. In an example, application 116 is a virtual memory monitor (VMM) that repeatedly accesses memory and performs some actions based on changes to the memory.

Dirty memory manager 112 manages an internal dirty bitmap 126 that tracks guest usage of memory pages. Internal dirty bitmap 126 is located in hypervisor memory 120 and may change at any time. Hypervisor 112 may access a dirty bitmap in a variety of ways. In an example, dirty bits are stored in the page tables, and hypervisor 112 traverses the pages table entries one-by-one, fetches the bits corresponding to dirty bits, and writes the dirty bit to internal dirty bitmap 126. In such an example, hypervisor 112 may be slow because internal dirty bitmap 126 is being accessed one bit at a time. In another example, dirty bits are stored in the page tables and processor 106 informs hypervisor 112 which bits have been set so that it may be unnecessary for hypervisor 112 to traverse the pages table entries one-by-one.

In another example, hypervisor 112 marks the pages in guest memory 132 as read-only. When guest 130 writes to a page, the memory access is trapped into hypervisor 112. Based on this trap, hypervisor 112 may set a bit in internal dirty bitmap 126 corresponding to the page to a first value, and change the page table from read-only to read-write, which traps into hypervisor 112 again. Before dirty memory manager 122 copies internal dirty bitmap 126 into shared dirty bitmap 202, hypervisor 112 may mark the pages as read-only. By marking the pages as read-only again, another memory access by guest 130 (or another guest 130 running on host machine 102) may trap into hypervisor 112. In such an example, hypervisor 112 maintains its own internal dirty bitmap 126 and it may be unnecessary for processor 106 to inform hypervisor 112 regarding which bits have been set. Accordingly, when hypervisor gets a trap, it can be a read-only trap or a "log some pages that have become dirty" trap. In such an example, hypervisor 112 may be faster because internal dirty bitmap 126 may be accessed, for example, one word at a time compared to one bit at a time.

Snapshots may be taken of internal dirty bitmap 126 in order to view internal dirty bitmap 126 at a particular point in time. A particular snapshot of internal dirty bitmap 126 indicates whether guest 130 has updated one or more pages in guest memory 132 since a previously received request for a snapshot of the internal dirty bitmap. As discussed further below, a page that is written by a guest is a "dirty page" and may be reset to a "clean page." Internal dirty bitmap 126 stores bits, where each bit has a zero or a one value corresponding to a page in memory 108, and may reveal the differences in a memory region between two points in time.

It may be difficult for the VMM to see a consistent view of and perform work on a large bitmap. Application 116 may send a request 136 for a snapshot of internal dirty bitmap 126, which is stored at a first region of memory in hypervisor memory 120. Application 116 may send request 136 to hypervisor 112 if application 116 desires to look at changes in memory 108. Alternatively, request 136 may be a request to access guest memory 132, which may prompt hypervisor 112 to send a snapshot of internal dirty bitmap 126 to the application.

Hypervisor 120 receives request 136 for a snapshot of an internal dirty bitmap stored at the first region of memory. Before sending a dirty bitmap to application 116, hypervisor 112 may invalidate cache lines associated with a page in one or more entries of set of guest page tables 134, as further discussed below. Hypervisor 112 may invalidate these cache lines without informing the user of the dirty bits of the invalidation because the user may be unaware of the memory conflict between guest 130 and hypervisor 112 and which memory is cacheable or uncacheable. The user of the dirty bits may be, for example, an application running on host machine 102 or a VMM. Additionally, hypervisor 112 may invalidate these cache lines without regard for the memory attributes associated with the cache lines.

Figure 2:
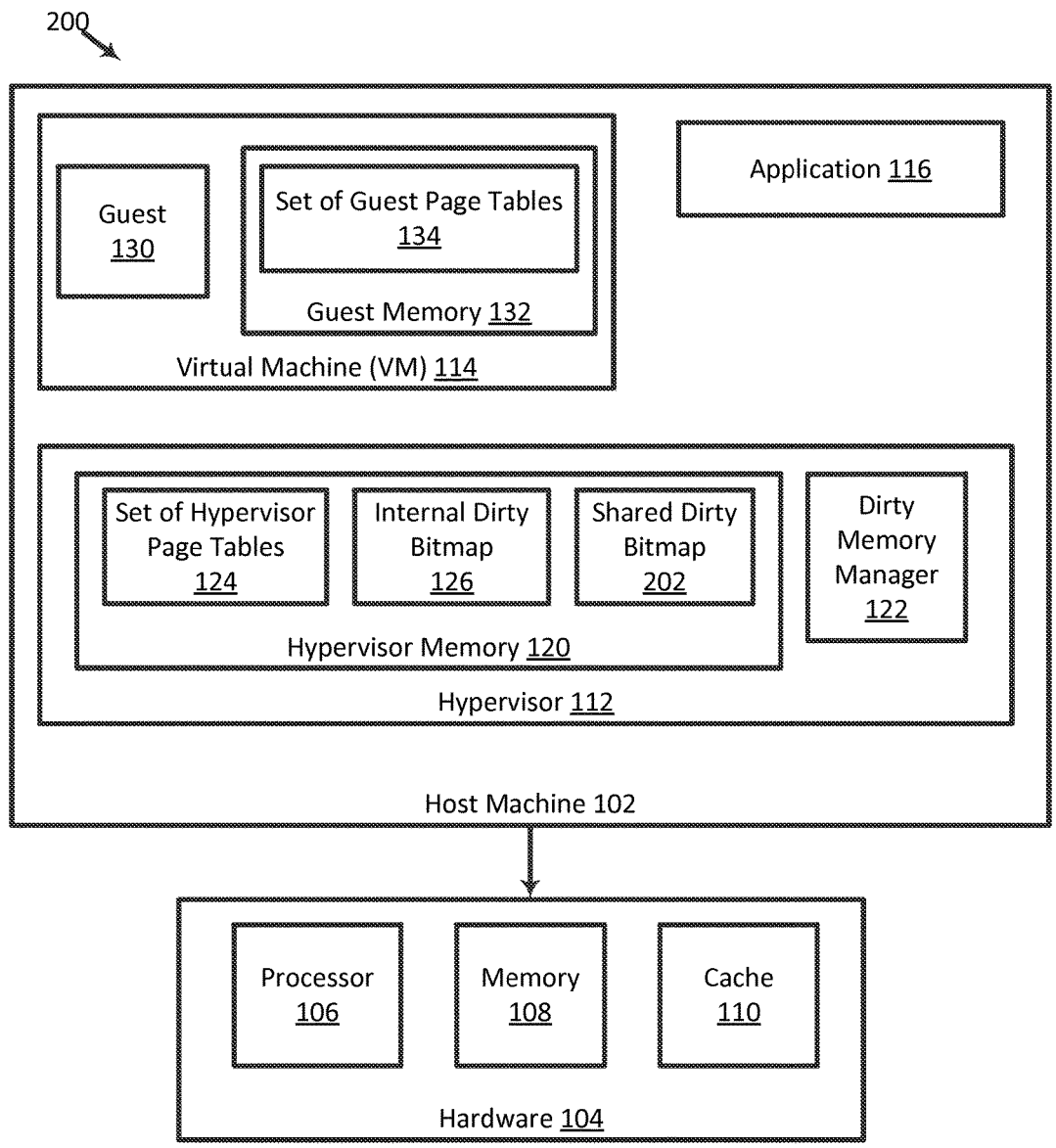
FIG. 2 illustrates a shared dirty bitmap stored in hypervisor memory, according to some embodiments.

Dirty memory manager 122 fetches internal dirty bitmap 126 and makes a copy of it to return to application 116. The copy of internal dirty bitmap 126 is referred to as a shared dirty bitmap. FIG. 2 illustrates a shared dirty bitmap 202 stored in hypervisor memory 120, according to some embodiments. Hypervisor 112 fetches internal dirty bitmap 126 and copies a set of bits of internal dirty bitmap 126 into a second region of memory. The second region of memory stores shared dirty bitmap 202 and is shared between hypervisor 112 and application 116. Accordingly, both hypervisor 112 and application 116 have access to the second region of memory. Each bit of shared dirty bitmap 202 corresponds to a page that was or was not accessed by a guest running in host machine 102. A first set of bits of shared dirty bitmap 202 having the first value indicates that the guest has updated a first set of pages corresponding to the first set of bits since a previous request for a snapshot of the internal dirty bitmap was received, and a second set of bits of shared dirty bitmap 202 having the second value indicates that the guest has not updated a second set of pages corresponding to the second set of bits since the previous request was received.

For each bit of the copied set of bits having a first value in internal dirty bitmap 126, dirty memory manager 122 sets the respective bit to a second value. In an example, the first value is one, and the second value is zero.

If hypervisor 112 or host machine 102 desires to access memory that was accessed by guest 130, it may be desirable for hypervisor 112 to invalidate all cache lines in a set of pages corresponding to one or more bits having the first value in shared dirty bitmap 202. In some embodiments, hypervisor 112 invalidates all cache lines in a first set of pages corresponding to one or more bits having the first value in shared dirty bitmap 202. The first set of pages includes dirty pages that have been accessed by the guest since the last request for a snapshot of internal dirty bitmap 126. Invalidating all cache lines in the first set of pages marks the set of pages as not cached in hypervisor 112. Additionally, cache lines in a second set of pages corresponding to a bit having the second value are not invalidated. Rather, the invalidation action is skipped for the second set of pages because this set of pages is clean.

In some embodiments, dirty memory manager 122 atomically copies a set of bits of internal dirty bitmap 126 into shared dirty bitmap 202 and sets each bit of the set of bits having the first value to the second value in internal dirty bitmap 126. In an example, in each atomic transaction, dirty memory manager 122 copies the set of bits of internal dirty bitmap 126 into shared dirty bitmap 202, and for each bit of the set of bits having the first value in internal dirty bitmap 126, dirty memory manager 122 sets the respective bit to the second value in internal dirty bitmap 126. Copying the set of bits may include, for example, copying one bit or a word (32- or 64-bits) at a time from internal dirty bitmap 126 to shared dirty bitmap 202, per atomic transaction. In an example, if dirty memory manager 122 fetches a 64-bit word, dirty memory manager 122 may read each of the bits in the 64-bit word, and in an atomic transaction, for each bit having the first value, dirty memory manager 122 may set the respective bit to the second value in internal dirty bitmap 126. Other bit quantities are within the scope of the present disclosure. For example, dirty memory manager 122 may fetch a 32-bit word or 128 bits at a time, copy these bits from internal dirty bitmap 126 to shared dirty bitmap 202, and set the appropriate bits in internal dirty bitmap 126 to the second value.

After the appropriate cache lines are invalidated, dirty memory manager 122 may provide shared dirty bitmap 202 to application 116. Shared dirty bitmap 202, which is provided to application 116, is a snapshot of internal dirty bitmap 126. In some examples, after an atomic transaction has completed, dirty memory manager 122 may invalidate all cache lines in the set of pages corresponding to one or more bits having the first value, or may wait until all of the atomic transactions complete before invalidating the cache lines in the set of pages corresponding to one or more bits having the first value. After the appropriate cache lines are invalidated, the bits in internal dirty bitmap 126 that were copied over to shared dirty bitmap 202 have the second value and represent a new snapshot of internal dirty bitmap 126. For example, after dirty memory manager 122 resets the appropriate bits of internal dirty bitmap 126 such that the region that was copied stores bits having the second value, internal dirty bitmap 126 represents a new snapshot of internal dirty bitmap 126.

In an example, shared dirty bitmap 202 represents internal dirty bitmap 126 at time T0 to T1, and the new snapshot represents internal dirty bitmap 126 starting at time T1. Dirty memory manager 122 may start the new snapshot storing only bits having the second value. Subsequently, application 116 (or another application running on host machine 102) may send a request for a snapshot of internal dirty bitmap 126. In an example, application 116 is a VMM that sends request 136 for a snapshot of internal dirty bitmap 126 and then sends a subsequent request for another snapshot of internal dirty bitmap 126. In such an example, the VMM may desire to work on another portion of memory different from that worked on based on request 136. In response to receiving this request, hypervisor 112 may perform the above actions in order to provide the requester with a copy of internal dirty bitmap 126 (a shared dirty bitmap) and reset the appropriate bits of internal dirty bitmap 126 to the second value to start a new snapshot. The new shared dirty bitmap that is sent to application 116 may represent internal dirty bitmap 126 at time T1 to T2.

Figure 3:
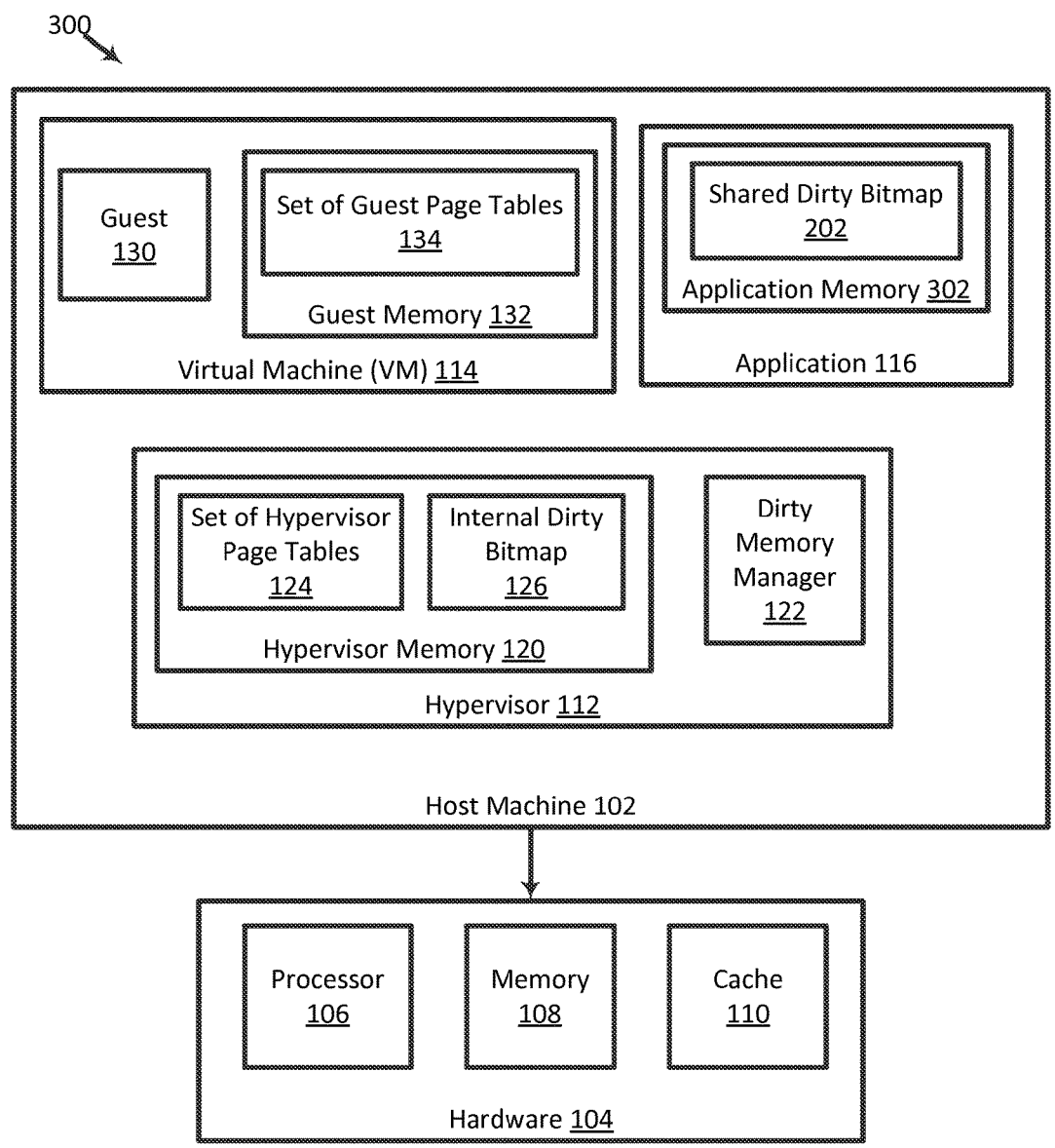
FIG. 3 illustrates a shared dirty bitmap stored in application memory, according to some embodiments.

As discussed above and further emphasized here, FIGS. 1 and 2 are merely examples, which should not unduly limit the scope of the claims. For example, although shared dirty bitmap 202 is illustrated as being stored in hypervisor memory 120, this is not intended to be limiting. For example, shared dirty bitmap 202 may be stored in application memory. FIG. 3 illustrates shared dirty bitmap 202 stored in application memory 302, according to some embodiments. Accordingly, the region of memory that stores the shared dirty bitmap may be mapped to the application memory space or the hypervisor memory space. Additionally, although the above examples described the first value as being one and the second value being as zero, this is not intended to be limiting. In another example, the first value is zero, and the second value is one.

III. Example Method

Figure 4:
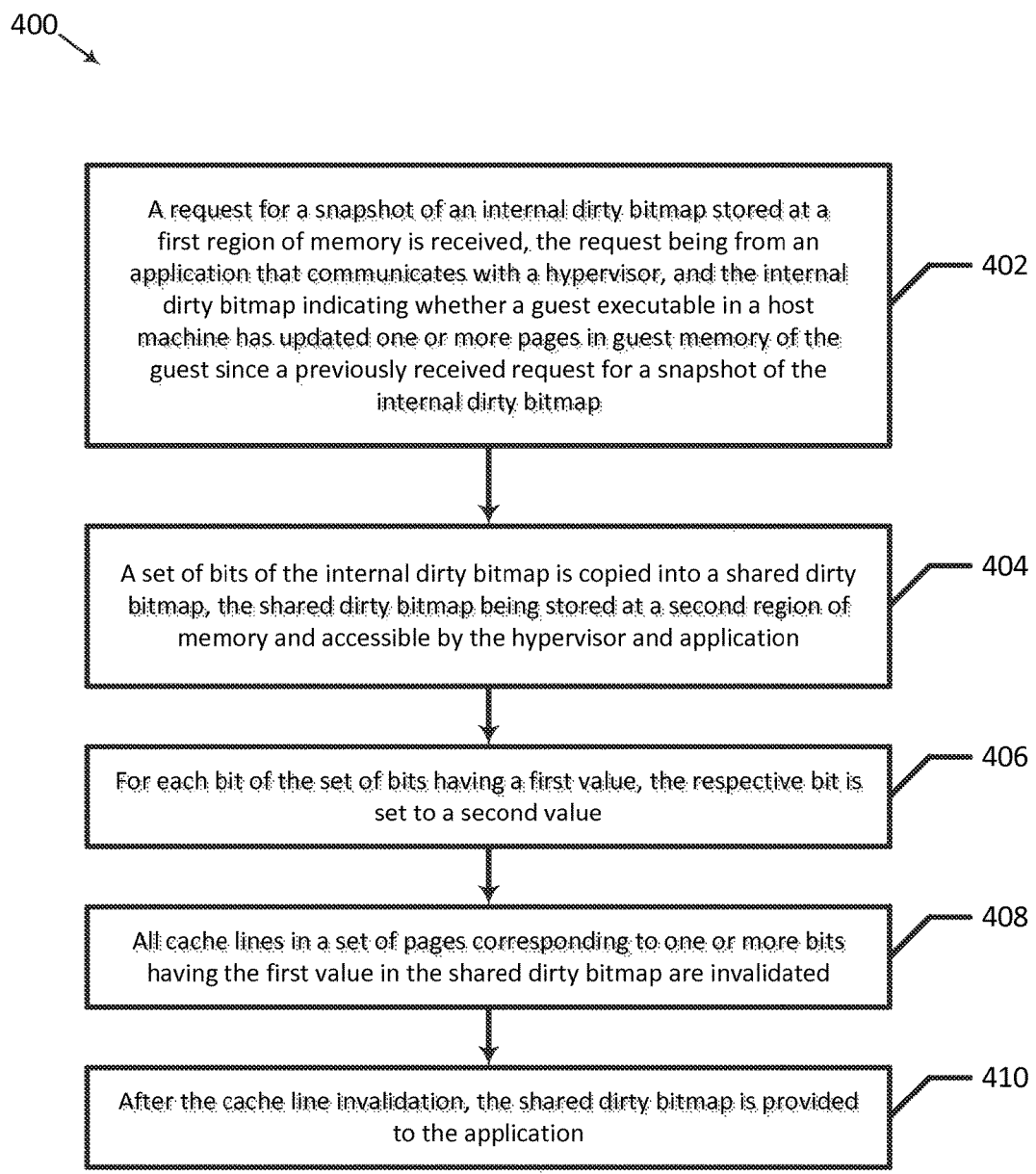
FIG. 4 is a simplified flowchart illustrating a method of providing a dirty bitmap to an application executable in a host machine, according to some embodiments.

FIG. 4 is a simplified flowchart illustrating a method 400 of providing a dirty bitmap to an application executable in a host machine, according to some embodiments. Method 400 is not meant to be limiting and may be used in other applications.

Method 400 includes blocks 402-410. In a block 402, a request for a snapshot of an internal dirty bitmap stored at a first region of memory is received, the request being from an application that communicates with a hypervisor, and the internal dirty bitmap indicating whether a guest executable in a host machine has updated one or more pages in guest memory of the guest since a previously received request for a snapshot of the internal dirty bitmap. In an example, hypervisor 112 receives request 136 for a snapshot of internal dirty bitmap 126 stored in hypervisor memory 120, the request being from application 116 that communicates with hypervisor 112, and internal dirty bitmap 126 indicating whether guest 130 executable in host machine 102 has updated one or more pages in guest memory 132 of guest 130 since a previously received request for a snapshot of internal dirty bitmap 126.

In a block 404, a set of bits of the internal dirty bitmap is copied into a shared dirty bitmap, the shared dirty bitmap being stored at a second region of memory and accessible by the hypervisor and application. In an example, dirty memory manager 122 copies a set of bits of internal dirty bitmap 126 into shared dirty bitmap 202, which is stored at a region of memory accessible by hypervisor 112 and application 116.

In a block 406, for each bit of the set of bits having a first value, the respective bit is set to a second value. In an example, for each bit of the set of bits having a first value, dirty memory manager 122 sets the respective bit to a second value. Dirty memory manager 122 sets the bits in internal dirty bitmap 126 to the second value, and leaves the bits in shared dirty bitmap 202, which represents a snapshot of internal dirty bitmap 126.

In a block 408, all cache lines in a set of pages corresponding to one or more bits having the first value in the shared dirty bitmap are invalidated. In an example, dirty memory manager 122 invalidates all cache lines in a set of pages corresponding to one or more bits having the first value in shared dirty bitmap 202. In a block 410, after the cache line invalidation, the shared dirty bitmap is provided to the application. In an example, after the invalidation, dirty memory manager 122 provides shared dirty bitmap 202 to application 116.

In some embodiments, one or more actions illustrated in blocks 402-410 may be performed for any number of requests 136 received by hypervisor 112. It is also understood that additional processes may be performed before, during, or after blocks 402-410 discussed above. It is also understood that one or more of the steps of method 400 described herein may be omitted, combined, or performed in a different sequence as desired.

IV. Example Computing System

Figure 5:
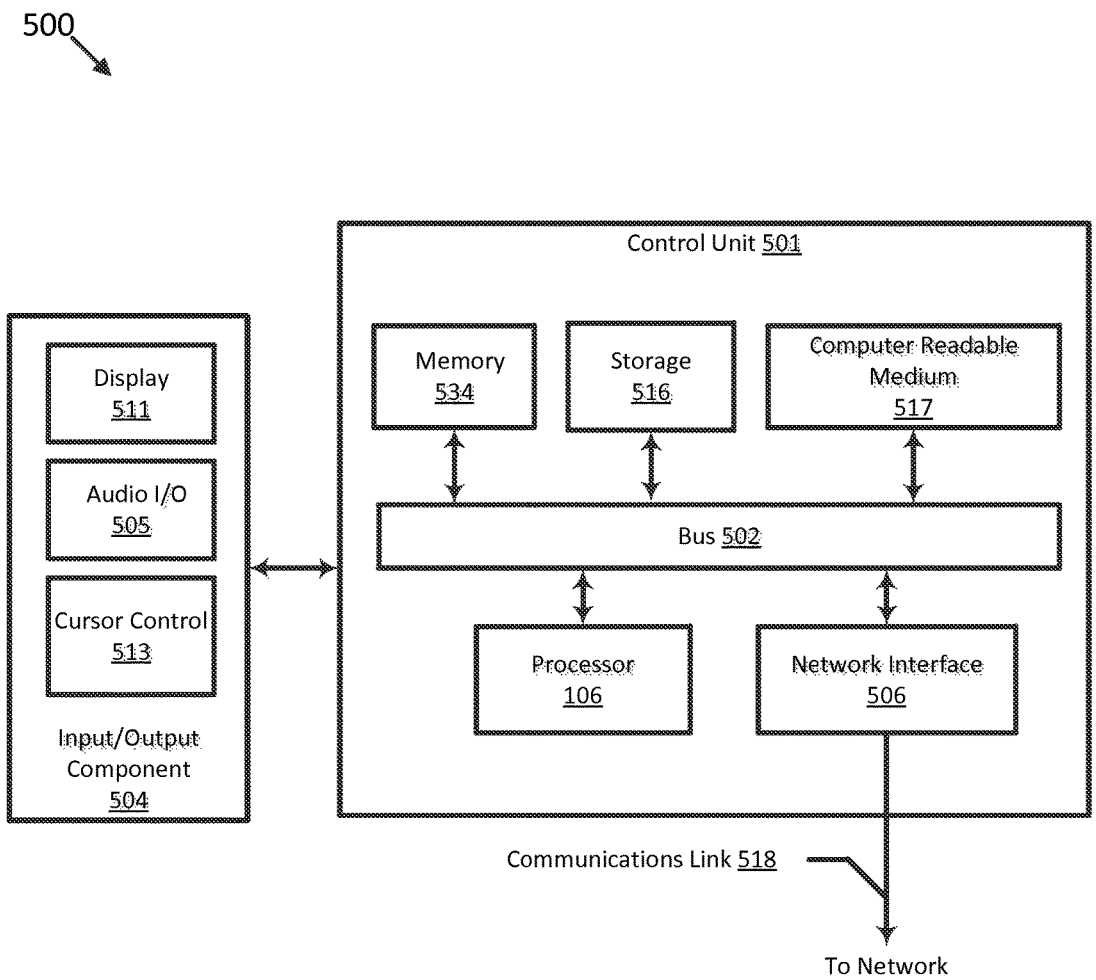
FIG. 5 is a block diagram of an electronic system suitable for implementing one or more embodiments of the present disclosure.

FIG. 5 is a block diagram of a computer system 500 suitable for implementing one or more embodiments of the present disclosure. In various implementations, host machine 102 may include a client or a server computing device. The client or server computing device may include one or more processors. The client or server computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). An optional audio input/output component 505 may also be included to allow a user to use voice for inputting information by converting audio signals into information signals. Audio I/O component 505 may allow the user to hear audio. A transceiver or network interface 506 transmits and receives signals between computer system 500 and other devices via a communication link 518 to a network. In an embodiment, the transmission is wireless, although other transmission mediums and methods may also be suitable. A processor 106, which may be a microcontroller, digital signal processor (DSP), or other processing component, processes these various signals, such as for display on computer system 500 or transmission to other devices via communication link 518. Processor 106 may also control transmission of information, such as cookies or IP addresses, to other devices.

Components of computer system 500 also include a system memory component 534 (e.g., RAM), a static storage component 516 (e.g., ROM), and/or a disk drive 517. Computer system 500 performs specific operations by processor 106 and other components by executing one or more sequences of instructions contained in system memory component 534. Logic may be encoded in a computer readable medium, which may refer to any medium that participates in providing instructions to processor 106 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 400) to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of providing a dirty bitmap to an application executable in a host machine, comprising:
receiving, by a hypervisor executable in a host machine, a request for a snapshot of an internal dirty bitmap stored at a first region of memory, the request being from an application that communicates with the hypervisor;
copying a set of bits of the internal dirty bitmap into a shared dirty bitmap, the shared dirty bitmap being stored at a second region of memory and accessible by the hypervisor and application, wherein a first set of bits of the shared dirty bitmap having a first value indicates that a guest executable in the host machine has updated a guest page corresponding to the first set of bits, and wherein a second set of bits of the shared dirty bitmap having a second value indicates that the guest has not updated a guest page corresponding to the second set of bits, and wherein the guest maintains a set of guest page tables including an entry indicating that a first page in the guest memory is uncacheable, and the hypervisor maintains a set of hypervisor page tables including an entry indicating that a second page in host memory is cacheable, and wherein the internal dirty bitmap indicates that the guest has updated the first page in the guest memory, and the first page in the guest memory maps to the second page in the host memory;
for each bit of the set of bits of the internal dirty bitmap having the first value, setting the respective bit to the second value;
invalidating all cache lines in a set of pages corresponding to one or more bits having the first value in the shared dirty bitmap; and after the invalidating, providing the shared dirty bitmap to the application.

2. The method of claim 1, wherein the invalidating all cache lines in the set of pages marks the set of pages as not cached in the hypervisor.

3. The method of claim 1, wherein cache lines in a second set of pages corresponding to a bit having the second value are not invalidated.

4. The method of claim 1, wherein the copying and setting includes in one or more atomic transactions:
copying the set of bits of the internal dirty bitmap into the shared dirty bitmap; and
for each bit of the set of bits having the first value, setting the respective bit to the second value in the internal dirty bitmap.

5. The method of claim 4, wherein the invalidating includes after an atomic transaction has completed, invalidating all cache lines in the set of pages corresponding to one or more bits having the first value.

6. The method of claim 4, wherein the invalidating includes after all of the one or more atomic transactions has completed, invalidating all cache lines in the set of pages corresponding to one or more bits having the first value.

7. The method of claim 4, wherein the copying a set of bits includes copying one bit of the internal dirty bitmap per atomic transaction.

8. The method of claim 4, wherein the copying a set of bits includes copying a word of the internal dirty bitmap per atomic transaction.

9. The method of claim 1, further including:
starting a new snapshot of the internal dirty bitmap, each bit in the new snapshot having the second value.

10. The method of claim 1, wherein the internal dirty bitmap indicates whether the guest has updated one or more pages in guest memory of the guest since a previously received request for a snapshot of the internal dirty bitmap.

11. The method of claim 1, wherein a first set of bits of the internal dirty bitmap copied into the shared dirty bitmap is the first set of bits of the shared dirty bitmap, and a second set of bits of the internal dirty bitmap copied into the shared dirty bitmap is the second set of bits of the shared dirty bitmap.

12. A system for providing a dirty bitmap to an application executable in a host machine, comprising:
a first region of memory that stores an internal dirty bitmap indicating whether a guest executable in a host machine has updated one or more pages in guest memory of the guest since a previously received request for a snapshot of the internal dirty bitmap;
a hypervisor that receives a request for a snapshot of the internal dirty bitmap, from an application; and
a dirty memory manager that copies a set of bits of the internal dirty bitmap into a shared dirty bitmap stored at a second region of memory, wherein a first set of bits of the shared dirty bitmap having a first value indicates that the guest has updated a guest page corresponding to the first set of bits, and wherein a second set of bits of the shared dirty bitmap having a second value indicates that the guest has not updated a guest page corresponding to the second set of bits,
wherein the guest maintains a set of guest page tables including an entry indicating that a first page in the guest memory is cacheable, and the hypervisor maintains a set of hypervisor page tables including an entry indicating that a second page in host memory is uncacheable, and wherein the internal dirty bitmap indicates that the guest has updated the first page in the guest memory, and the first page in the guest memory maps to the second page in the host memory,
wherein the dirty memory manager sets each bit in the internal dirty bitmap having the first value to the second value, invalidates all cache lines in a set of pages corresponding to one or more bits having the first value in the shared dirty bitmap, and provides the shared dirty bitmap to the application after the cache lines in the set of pages have been invalidated, and wherein the second region of memory is accessible by the hypervisor and application.

13. The system of claim 12, wherein a page corresponding to a bit having the first value is a dirty page.

14. The system of claim 12, wherein in each atomic transaction, the dirty memory manager (i) copies the set of bits of the internal dirty bitmap into the shared dirty bitmap, and (ii) for each bit of the set of bits having the first value, sets the respective bit to the second value in the internal dirty bitmap.

15. The system of claim 14, wherein after a set of atomic transactions has completed, the dirty memory manager invalidates cache lines in the set of pages corresponding to one or more bits having the first value.

16. The system of claim 12, wherein the internal dirty bitmap indicates whether the guest has updated one or more pages in guest memory of the guest since a previously received request for a snapshot of the internal dirty bitmap.

17. The system of claim 12, wherein a first set of bits of the internal dirty bitmap copied into the shared dirty bitmap is the first set of bits of the shared dirty bitmap, and a second set of bits of the internal dirty bitmap copied into the shared dirty bitmap is the second set of bits of the shared dirty bitmap.

18. A non-transitory machine-readable medium comprising a plurality of machine-readable instructions that when executed by one or more processors causes the one or more processors to perform a method comprising:
receiving, by a hypervisor executable in a host machine, a request for a snapshot of an internal dirty bitmap stored at a first region of memory, the request being from an application that communicates with the hypervisor
copying a set of bits of the internal dirty bitmap into a shared dirty bitmap, the shared dirty bitmap being stored at a second region of memory and accessible by the hypervisor and application, wherein a first set of bits of the shared dirty bitmap having a first value indicates that a guest executable in the host machine has updated a guest page corresponding to the first set of bits, and wherein a second set of bits of the shared dirty bitmap having a second value indicates that the guest has not updated a guest page corresponding to the second set of bits, and wherein the guest maintains a set of guest page tables including an entry indicating that a first page in the guest memory is uncacheable, and the hypervisor maintains a set of hypervisor page tables including an entry indicating that a second page in host memory is cacheable, and wherein the internal dirty bitmap indicates that the guest has updated the first page in the guest memory, and the first page in the guest memory maps to the second page in the host memory;
for each bit of the set of bits of the internal dirty bitmap having the first value, setting the respective bit to the second value;
invalidating all cache lines in a set of pages corresponding to one or more bits having the first value in the shared dirty bitmap; and after the invalidating, providing the shared dirty bitmap to the application.

19. The machine-readable medium of claim 18, wherein the invalidating all cache lines in the set of pages marks the set of pages as not cached in the hypervisor.

20. The machine-readable medium of claim 18, wherein a first set of bits of the shared dirty bitmap having the first value indicates that the guest has updated a page corresponding to the first set of bits since a previous request for a snapshot of the internal dirty bitmap was received, and wherein a second set of bits of the shared dirty bitmap having the second value indicates that the guest has not updated a page corresponding to the second set of bits since the previous request was received.

* * * * *